United States Patent
Shoultz et al.

(10) Patent No.: US 10,649,671 B2
(45) Date of Patent: May 12, 2020

(54) PROCESSING UNKNOWN OR UNEXPECTED PROPERTIES ENCOUNTERED DURING MIGRATION OR ARCHIVING OPERATIONS

(71) Applicant: Quest Software Inc., Aliso Viejo, CA (US)

(72) Inventors: Nathan N. Shoultz, Madison, WI (US); Tomas Willis, Madison, WI (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 308 days.

(21) Appl. No.: 14/719,224

(22) Filed: May 21, 2015

(65) Prior Publication Data
US 2016/0342350 A1 Nov. 24, 2016

(51) Int. Cl.
*G06F 3/06* (2006.01)
*G06F 11/00* (2006.01)

(52) U.S. Cl.
CPC .......... *G06F 3/0619* (2013.01); *G06F 3/067* (2013.01); *G06F 3/0647* (2013.01); *G06F 11/00* (2013.01)

(58) Field of Classification Search
None
See application file for complete search history.

(56) References Cited

U.S. PATENT DOCUMENTS

| | | | | |
|---|---|---|---|---|
| 7,251,680 B2 * | 7/2007 | DeVos | .................... | H04L 51/08 709/206 |
| 7,406,455 B1 * | 7/2008 | Gruen | .................. | G06N 99/005 706/45 |
| 9,311,679 B2 * | 4/2016 | Shih | ....................... | G06Q 50/01 |
| 9,769,150 B2 * | 9/2017 | Topatan | .............. | H04L 63/0823 |
| 2002/0073080 A1 * | 6/2002 | Lipkin | .............. | G06F 17/30867 |
| 2004/0068545 A1 * | 4/2004 | Daniell | .................... | H04L 12/58 709/206 |
| 2008/0275764 A1 * | 11/2008 | Wilson | ................... | G06Q 30/02 705/7.34 |
| 2012/0110485 A1 * | 5/2012 | Ranganath | ........... | G06F 17/303 715/769 |
| 2012/0265726 A1 * | 10/2012 | Padmanabhan | ....... | G06F 17/303 707/602 |
| 2013/0212200 A1 * | 8/2013 | Dennis | .................... | H04L 51/22 709/206 |
| 2013/0332505 A1 | 12/2013 | Karandikar | | |

(Continued)

OTHER PUBLICATIONS

U.S. Appl. No. 14/731,252 Office Action dated Apr. 3, 2017.
(Continued)

*Primary Examiner* — Mark D Featherstone
*Assistant Examiner* — Ranjit P Doraiswamy
(74) *Attorney, Agent, or Firm* — Maschoff Brennan

(57) ABSTRACT

A network-based solution for processing unknown or unexpected property encountered during a migration or archiving operation may include, as embodied in various systems, methods, and non-transitory computer-readable storage media, accessing a plurality of objects stored in memory of a source computing system. The solution may include performing a discovery assessment on each of a plurality of operator-selected objects. The discovery assessment may include examining a property associated with a document of each selected object and notifying the operator when the examination determines that the property is unknown or unexpected.

19 Claims, 5 Drawing Sheets

(56) References Cited

U.S. PATENT DOCUMENTS

| | | | |
|---|---|---|---|
| 2014/0279890 A1* | 9/2014 | Srinivasan | G06F 17/303 707/626 |
| 2015/0172120 A1* | 6/2015 | Dwarampudi | G06F 3/06 709/221 |
| 2016/0359746 A1 | 12/2016 | Obst | |
| 2016/0359953 A1 | 12/2016 | Lervik | |

OTHER PUBLICATIONS

U.S. Appl. No. 14/731,222, Jonathan C. Obst, Selectively Suppress or Throttle Migration of Data Across WAN Connections.
U.S. Appl. No. 14/731,721, Lars J. Lervik, Migration Enhanced by Presence, Instant Messaging, and Last Log-On Time.

* cited by examiner

PROCESSING UNKNOWN OR UNEXPECTED PROPERTIES ENCOUNTERED DURING MIGRATION OR ARCHIVING OPERATIONS

BACKGROUND OF THE INVENTION

Technical Field

The present disclosure concerns migration and archiving operations. More particularly, the present disclosure relates to a network-based solution for processing unknown or unexpected properties encountered during a migration or archiving operation.

Description of the Related Art

Today, businesses create, store, deliver, and receive electronic documents on an unprecedented level. Many businesses, for example, provide each employee with a personalized email account and dedicated mailbox within an enterprise email platform (e.g., Office 365™ offered by Microsoft, Inc.). In addition to emails, such email platforms often contain other types of electronic documents, such as contact profiles, calendar events, and the like. The result is that business-related computing systems (e.g., those that include email platforms, enterprise social media platforms, content management platforms, and the like) contain a wide array of properties associated with the documents they store. Common types of properties include object properties, data types, metadata, and others.

As more and more business platforms have taken root in the marketplace, the incidence of business switching between platforms has increased. When a business switches between platforms (or archives documents within an existing platform), its goal is to seamlessly transfer documents while maintaining a high degree of data fidelity. Given that need, migration and archiving solutions have come to play an important role in the modern digital era. Migration and archiving solutions facilitate the large-scale transfer of documents (and their associated properties) between platforms. Despite their prominence, however, existing migration and archiving continue to face certain technical hurdles.

Existing solutions can migrate or archive structured data when the properties of the documents being migrated are known or expected in advance. But that is not always the case. Because many business-related platforms allow system operators to customize properties (e.g., field names), no single migration or archiving solution can anticipate or account for every type of property it may encounter over its lifetime. When a solution runs into an unknown or unexpected property in an object targeted for a migration or archiving operation (e.g., the existence of an array when only a single value was expected, the existence of a freeform text string when structured data was expected, the existence of a custom data type name, etc.), the solution cannot properly carry out the operation. As a result, data is lost. At best, in some cases, the solution may migrate or archive the target document poorly by applying a default, lowest-common-denominator mapping that fails to give the operator any meaningful control. Given these shortcomings in the art, businesses need a solution for processing unknown or unexpected properties encountered during a migration or archiving solution.

SUMMARY OF THE CLAIMED INVENTION

A network-based solution for processing unknown or unexpected properties encountered during a migration or archiving operation is disclosed. In one claimed embodiment, a computer-implemented method for processing an unknown or unexpected property encountered during a migration or archiving operation includes accessing a plurality of objects stored in memory of a source computing system. At least some of the objects include a document. By way of executing instructions stored in memory of an application server communicatively coupled between the source computing system and a target computing system, the method includes displaying an identification of the portion of objects that include a document. The method includes receiving from the operator a selection of at least a subset of the objects that include a document and performing a discovery assessment on each of the selected objects. The discovery assessment includes examining a property associated with the document of each selected object and generating a notification when the examination determines that the property is unknown or unexpected.

In another claimed embodiment, a non-transitory computer-readable storage medium stores an executable computer program that, when executed by a processor, performs the foregoing method for processing an unknown or unexpected property encountered during a migration or archiving operation.

In a further claimed embodiment, a system for processing an unknown or unexpected property during a migration or archiving operation includes a source computing system, a target computing system, and an application server communicatively coupled by a network. The source computing system stores objects in memory, at least a portion of which each include a document. The application server includes instructions stored in memory that, when executed by a processor of the application server, display to an operator of the application server an identification of the objects that include a document. The application server further receives from the operator a selection of at least a subset of the objects that include a document. After receiving the selection, the application server performs a discovery assessment on each of the selected objects. The discovery assessment includes examining a property associated with the document of each selected object and generating a notification when the examination determines that the property is unknown or unexpected.

DETAILED DESCRIPTION

Figure 1:
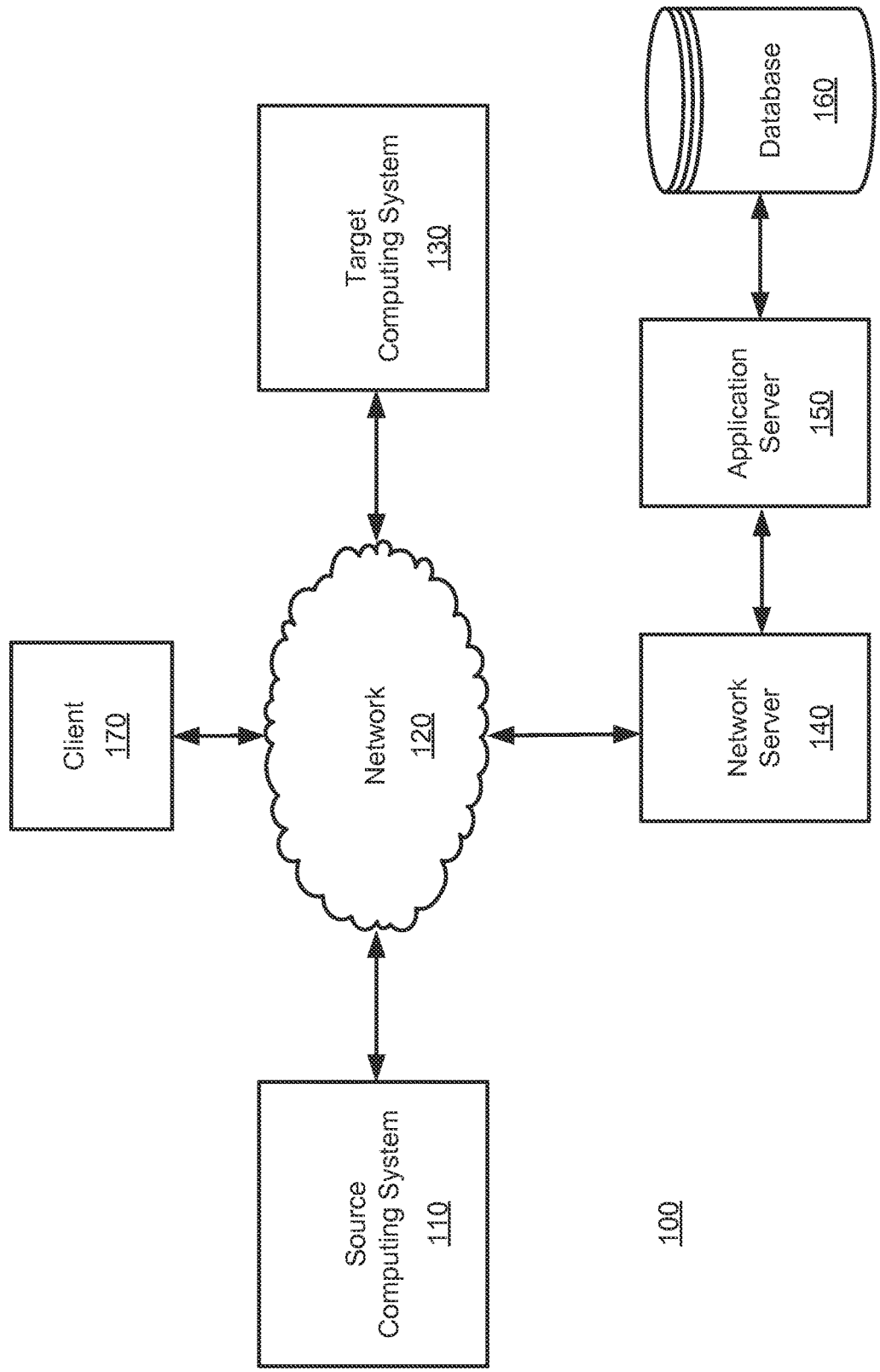
FIG. 1 is a block diagram of an exemplary environment in which a network-based solution for processing an unknown or unexpected property encountered during a migration or archiving operation may be implemented.

A network-based solution for processing unknown or unexpected properties encountered during a migration or archiving operation is disclosed.

Although the novel solution is illustrated in this disclosure by way of various systems, methods, and non-transitory computer-readable media, it should be understood that the embodiments described herein are exemplary only and are in no way limiting. For instance, although certain portions of the present disclosure discuss the solution in the context of migration operations, the solution is equally applicable to archiving operations and other similar operations. Thus, any use of migration operations as an illustrative example should not be construed as limited to only those types of operations. Persons of ordinary skill in the art will readily recognize and appreciate that the present disclosure suggests many other possible embodiments in addition to those expressly described herein.

The network-based solution, as may be embodied by various systems, methods, and non-transitory computer-readable storage media, addresses a persistent problem in the migration and archiving field by discovering and addressing problematic unknown documents properties (e.g. custom or nonstandard properties) and/or problematic unexpected properties (e.g., properties that are standard or non-custom but not anticipated in the context of the operation). For purposes of this disclosure, the term "unknown or unexpected property" broadly refers to any type of information associated with a document or object that cannot by default be recognized or accepted by a target computing system during a migration operation, archiving operation, or similar transfer operation. Exemplary unknown or unexpected properties may include source object properties, data types, metadata, or other types of information (e.g., uniquely named properties in Notes Domino™ or other source computing systems, unique contact properties in Notes Domino™ for which there is no directly related field in a Microsoft Exchange™ or Office365™ target computing system, calendar items that have nonstandard recurrence rules, documents that are accompanied by unrecognizable metadata as a result of having been migrated from system to system, nonstandard sensitivity or privacy strings, and the like).

The solution may be applied either prior to commencing a migration or archiving operation (e.g., as a pre-transfer assessment used to proactively minimize transfer problems) or during or after the operation (e.g., as a reactionary tool that may then be applied as a proactive tool in the future).

The solution may include or be applied in the context of any type of computing systems between which a migration, archiving, or similar transfer operation occurs. For example, the solution may include or be applied in the context of emails platforms (e.g., IBM Domino™, Office365™, etc.), enterprise social networking platforms (e.g., Jive™ or Yammer™), or other platforms (e.g., content management platforms).

FIG. 1 is a block diagram of an exemplary environment 100 in which a network-based solution for processing an unknown or unexpected property encountered during a migration or archiving operation may be implemented. As shown in FIG. 1, exemplary environment 100 may include a source computing system 110 communicatively coupled to a communications network 120. Source computing system 110 may be communicatively coupled to a target computing system 130 through network 120 and, in some cases, one or more intermediate computing devices (e.g., network server 140). Network server 140 may be communicatively coupled to an application server 150. Application server 150 may include a database 160 stored in memory. Alternatively, application server 150 may be communicatively coupled to one or more separate and distinct database servers (not shown) maintaining database 160 and executable instructions associated with managing the database (e.g., performing lookups). Each of the foregoing computing devices or systems may include a processor, a network interface that permits the device to exchange data with other devices, and memory storing executable instructions and data. When executed, the executable instructions, which may be arranged as software modules or any other suitable structure, perform one or more defined functionalities. In various embodiments, some or all of the foregoing devices may collectively embody the novel solution described herein as a system.

In one embodiment, source computing system 110 and target computing system 130 may each be a cloud-based or hosted email platform, some examples of which include Google Apps Gmail™, SunONE/iPlanet™, Novell GroupWise™, Microsoft Exchange 2000/2003/2007/2010™, Microsoft BPOS™, Microsoft Live@edu™, and Microsoft 365™. In other embodiments, source computing system 110 and target computing system 130 may each be an enterprise social media platform (e.g., Jive™ or Yammer™), a content management platform, or another type of system that stores objects and documents.

Source computing system 110 and target computing system 130 may each include one or more computing devices, such as network servers and mail servers, communicatively coupled together to form a self-contained platform. In embodiments concerning archiving operations, target email platform 130 may not be necessary. In some cases, for instance, objects primarily stored at source email platform 110 may be stored at a secondary storage location as part of the archiving process. In some instances, target computing system 130 may be the secondary storage system.

Source computing system 110 may include a plurality of objects stored in memory. The objects may be user mailboxes (e.g., where source computing system 110 is an email platform), a user or user profile (e.g., where source computing system 110 is an enterprise social media platform), a file, folder, or document library (e.g., where source computing system 110 is a content management system), or any number of other types of objects, such as a community site, a wiki site, a content management site, and others. Although the foregoing object types have been provided for illustrative purposes, persons of ordinary skill in the art will appreciate that the solution described herein applies to numerous other types of objects and that the objects expressly described are exemplary and in no way limit the scope of the solution.

At least a portion of the objects may each include a document capable of being migrated, archived, or otherwise transferred from source computing system 110 to target computing system 130 or a remote storage system. Each document may be any type of document associated with the object stored by source computing system 110, such as an email, a contact, a calendar event, a posting, a data file, and other documents. Although the foregoing document types have been provided for illustrative purposes, persons of ordinary skill in the art will appreciate that the solution described herein applies to numerous other types of documents and that the documents expressly described are exemplary and in no way limit the scope of the solution.

Network 120 may be implemented as a private network, a public network, an intranet, the Internet, or any suitable combination of the foregoing. Although FIG. 1 illustrates certain computing devices communicatively coupled to a single network 120 (e.g., source computing system 110, target computing system 130, network server 140, and client 170), persons of ordinary skill in the art will readily recognize and appreciate that all of the devices depicted in FIG. 1 may be communicatively coupled together through either a single network 120 or a series of such networks.

Network server 140 may receive and respond to requests transmitted over network 120 between the various computing devices depicted in FIG. 1 (e.g., between source computing system 110 and application server 150. Although network server 140 is depicted between network 120 and application server 150 in FIG. 1, persons of ordinary skill in the art will appreciate that the environment illustrated in FIG. 1 may in many cases include additional network servers between other computing devices and may implement a network service. In one embodiment, for example, network 120 may be the Internet and network server 140 may be a web server. In various possible embodiments, network server 140 and application server 150 may be incorporated into a single computing device or, alternatively, may function as standalone computing devices as illustrated in FIG. 1.

Application server 150 may communicate with multiple computing devices, including for example network server 140, source computing system 110, and target computing system 130. Application server 150 may host and maintain an executable application in memory. When executed, the application may perform a network-based, computer-implemented method for processing an unknown or unexpected property encountered during a migration or archiving operation. As noted above, network server 140 and application server 150 may be incorporated as a single computing device or, alternatively, they may function as standalone computing devices. Database 160 may store data, process data, and resolve queries received from application server 150.

A client 170 may be communicatively coupled to network 120 at a network interface and may be coupled either directly to network 120 or through any number of intermediate network servers, gateways, or other suitable computing devices. Client 170 may be a computing device, such as a desktop computer, workstation, laptop, smartphone, tablet, or other suitable computing device. Client 170 may include one or more locally stored applications and may be associated with a system operator (e.g., an IT professional responsible for handling migration and archiving operations for a particular company, association, or organization). Client 170 may include a network browser application through which the operator or other user may access network-based applications. The network browser may be a locally stored client application such as Chrome™, FireFox™, Safari™, Opera™, or Internet Explorer™. The network browser may permit the operator to view content provided to client 170 by application server 150. In some embodiments, client 170 may be a mobile device and, rather than viewing content provided to client 170 with a network browser application, administrator may do so through a custom mobile application downloaded and locally installed on client 170. Through one or more user interfaces displayed at client 170 (e.g., a log file display, command line feedback, a graphical user interface, etc.), the operator may communicate with application server 150 to configure, deploy, and monitor the executable application stored in memory of application server 150. In some embodiments, the solution may include receiving configuration settings from the operator that configure the network connection between the application server and the source computing system. Provided the benefit of the network-based solution described herein, client 170 may communicate with application server 150 to successfully process unknown or unexpected property encountered during a migration or archiving operation.

Figure 2:
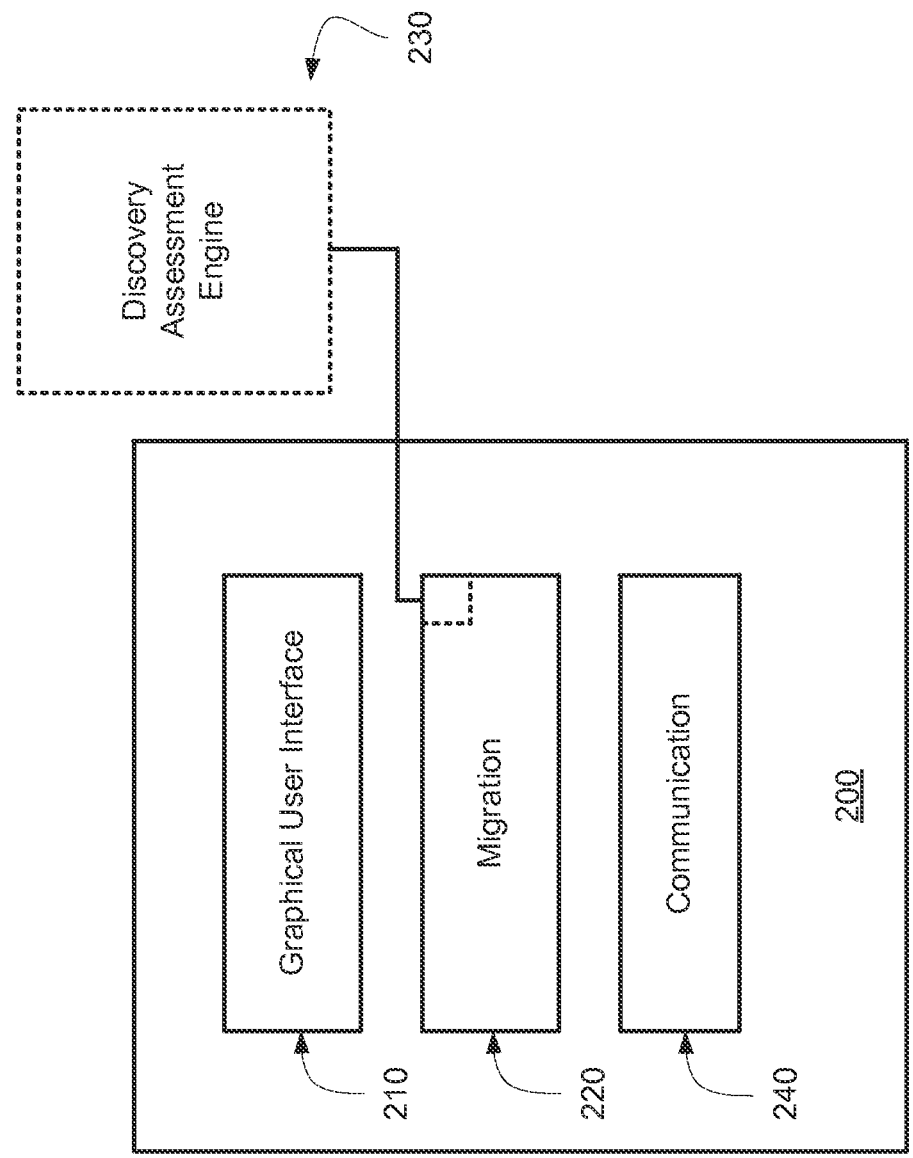
FIG. 2 is a block diagram of an exemplary application.

FIG. 2 is a block diagram of an exemplary application 200 stored in memory of application server 150. Application 200 may include a plurality of objects or modules, each of which may be responsible for effectuating one or more functionalities that contribute to the provision of a network-based solution for processing unknown or unexpected property encountered during a migration or archiving operation. Each module may include a data model associated with a particular functionality and executable computer instructions that, when executed, effectuate the functionality.

As shown in FIG. 2, application 200 may include a graphical user interface module 210, a migration module 220 (which may include one or more submodules such as discovery assessment engine 230), and a communication module 240. Graphical user interface module 210 may include executable instructions that, when executed by a processor of application server 150, effectuate functionality concerning the rendering and display of a series of graphical user interfaces at client 170. In some embodiments, graphical user interface module 210 may be a module that renders and displays non-graphical user interfaces (e.g., interfaces that provide command line feedback, communicate log file contents, or the like).

Migration module 220 may include executable instructions that, when executed by a processor of application server 150, effectuate functionality concerning the transfer of data (e.g., objects or documents and their associated properties) from source computing system 110 to target computing system 130. In the case of archiving operations and other possible scenarios, transferring the data may include transferring the data to a remote storage system.

Although FIG. 2 illustrates migration module 220 as a module directed to migration-related functionality, persons of ordinary skill in the art will readily appreciate that module 220 may likewise be an archiving module when the solution is applied within the archiving context. Thus, for purposes of the present disclosure, it should be understood that any references to a migration module are equally applicable to an archiving module within the archiving context.

Migration module 220 may include, as a sub-module, discovery assessment engine 230. As discussed later in greater detail, discovery assessment engine 230 may be executed prior to commencing migration (e.g., as a pre-migration assessment tool) or during or after migration. To that end, although FIG. 2 depicts discovery assessment engine 230 as a submodule of migration module 220, discovery assessment engine 230 may likewise exist as a standalone module of application 200 or, in some instances, a separate and distinct application altogether. In some cases, migration functionality and discovery assessment functionality may be executed by way of distinct applications stored on and executed by distinct computing devices or systems.

Figure 3:
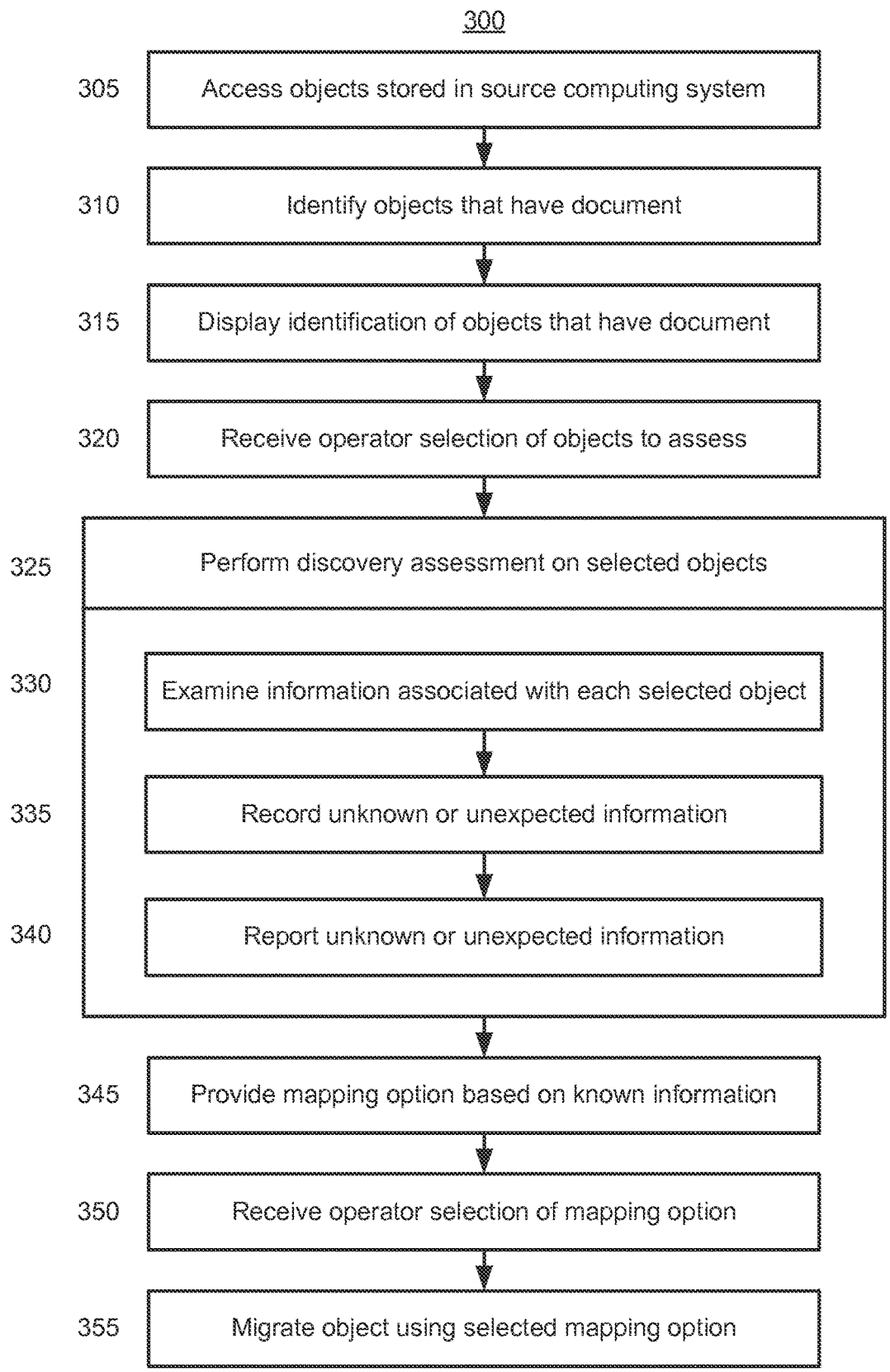
FIG. 3 is a flow diagram of an exemplary computer-implemented method for processing an unknown or unexpected property encountered during a migration or archiving operation.
Figure 4:
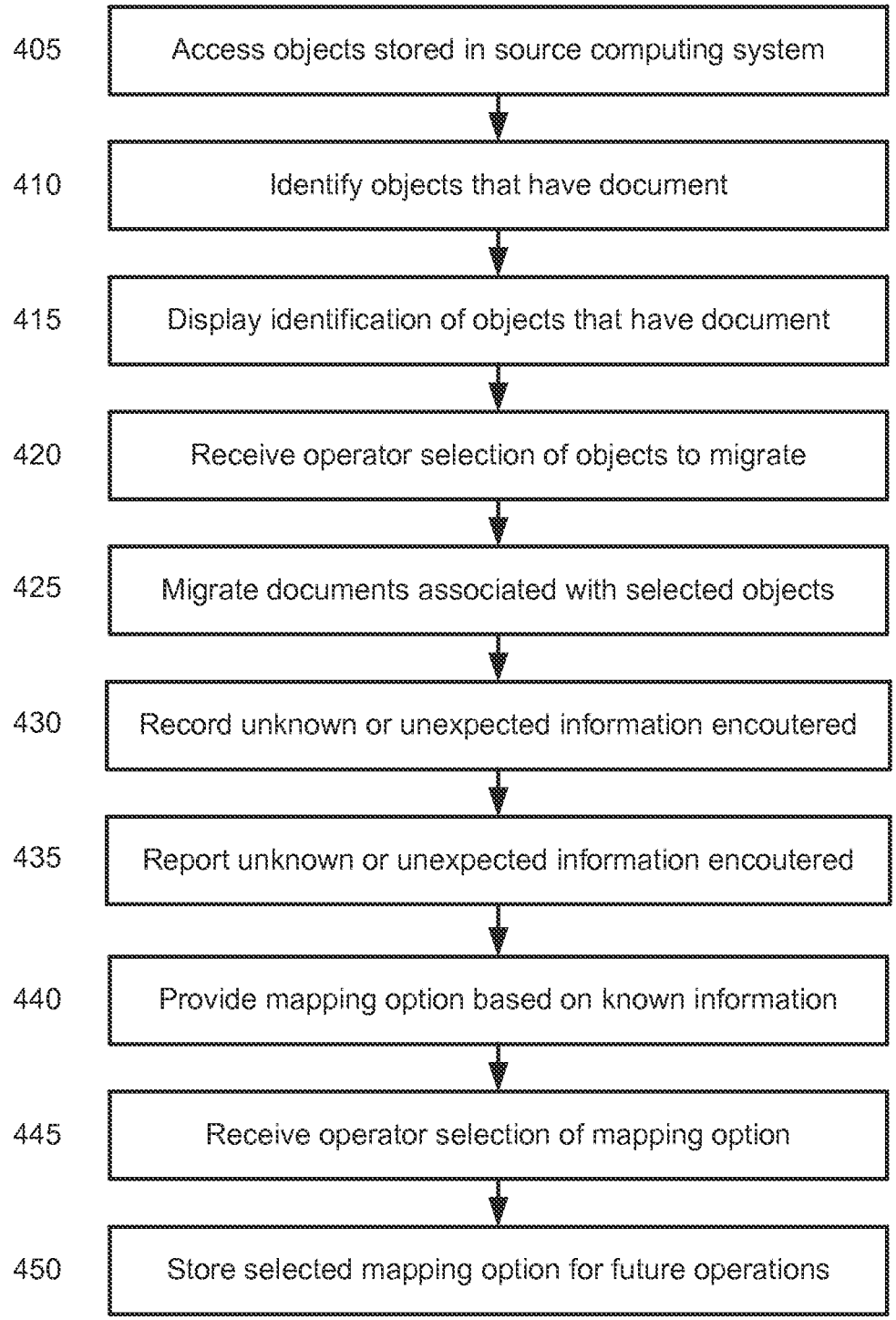
FIG. 4 is a flow diagram of another exemplary computer-implemented method for processing an unknown or unexpected property encountered during a migration or archiving operation.

As discussed further in the context of FIGS. 3 and 4, discovery assessment engine 230 may include executable instructions that, when executed by a processor of application server 150, effectuate functionality concerning the assessment of objects and documents accessed at source computing system 110, including the identification of certain documents as containing unknown or unexpected properties. An unknown or unexpected property may include an unknown or unexpected source object property, an unknown or unexpected data type property, unknown or unexpected metadata, or any other type of information associated with a document or object that cannot by default be recognized or accepted by a particular target computing system 130. As previously discussed, persons of ordinary skill in the art should readily recognize and appreciate that the term "unknown or unexpected property" broadly refers to any type of information associated with a document or object that cannot by default be recognized or accepted by a particular target computing system 130, whether unknown or known but simply not anticipated (e.g., an unknown object property, an unexpected object property, an unknown data type, an unexpected data type, unknown metadata, unexpected metadata, etc.). Although the exemplary embodiment depicted in FIG. 2 references discovery assessment engine 230 in the context of a migration operation, persons of ordinary skill in the art will readily appreciate that discovery assessment engine 230 may likewise be used in the context of archiving operations.

Communication module 240 may include executable instructions that, when executed by a processor of application server 150, effectuate functionality concerning communications between application server 150 and other computing devices in the exemplary environment depicted in FIG. 1 (e.g., source computing system 110, network server 140, and target computing system 130).

Persons of ordinary skill in the art will readily recognize that the foregoing modules, including migration module 220, are exemplary in nature and that application 200 may include any number of other modules depending on the anticipated structure of the environment depicted in FIG. 1. Moreover, although exemplary modules have been illustrated as distinct from another, persons of ordinary skill in the art will appreciate that various modules may alternatively be combined. For instance, the functionalities effectuated by communication module 240 may, in some embodiments, be integrated into migration module 220 depending on design considerations and preferences.

FIG. 3 is a flow diagram of an exemplary computer-implemented method 300 for processing an unknown or unexpected property encountered during a migration or archiving operation. Computer-implemented method 300 provides system operators an effective solution for overcoming problematic scenarios in which a source computing system and a target computing system do not recognize or accept all of the same document properties. Method 300, as described below and through its various alternative embodiments, provides a solution to a persistent problem in the migration and archiving fields—two fields inexorably tied to hardware, software, and network-related considerations—and enhances existing migration and archiving technologies.

In some embodiments, method 300 may be performed by migration module 220 and/or discovery assessment engine 230 as described in the context of FIG. 2. Depending on various software architecture considerations, the steps of exemplary method 300 may be distributed across various software modules, including other software modules in addition to migration module 220 and discovery assessment engine 230. The software module may be stored on and executed by a single computing device, such as application server 150, or the modules maybe distributed across numerous distinct computing devices forming a system (e.g., multiple application servers 150 in a distributed server network). Thus, for purposes of the present disclosure, it should be understood that references to a particular module performing a step (e.g., discovery assessment engine 230) are not limiting, but rather that the step may likewise be performed by another appropriate module (e.g., migration module 220 in embodiments where discovery assessment engine 230 does not exist as a separate and distinct sub-module). The exemplary steps of method 300 may be performed in the order shown, or they may be performed in an alternative order. The order shown is merely exemplary.

Discovery assessment engine 230 may include executable instructions that, when executed by a processor of application server 150, perform computer-implemented method 300. At block 305, upon execution, discovery assessment engine 230 may access a plurality of objects stored in memory of source computing system 110. At least a portion of the accessed objects may each include a document capable of being migrated or archived. An unknown or unexpected property may include an unknown or unexpected source object property, an unknown or unexpected data type property, unknown or unexpected metadata, or any other type of information associated with a document or object that cannot by default be mapped to a corresponding type of information recognized or accepted by target computing system 130. As previously discussed, persons of ordinary skill in the art should readily recognize and appreciate that the term "unknown or unexpected property" broadly refers to any type of information associated with a document or object that cannot by default be recognized or accepted by target computing system 130.

In some embodiments, application server 150 may access the objects by downloading each of the objects from source computing 110. In other embodiments, application server 150 may access the objects without downloading them. The objects may, for instance, instead be scanned or accessed by issuing search commands over the network that are then fulfilled by the source computing system (e.g., by employing one or more messaging APIs over the network). Persons of ordinary skill in the art will readily recognize and appreciate that other suitable methods for accessing the objects may alternatively be used.

At block 310, discovery assessment engine 230 may identify the portion of objects that each includes a document capable of being migrated or archived. The portion of objects identified may at block 310 may include a single object stored in source computing system 110, every object stored in source computing system 110, or any intermediate number of objects stored in source computing system 110.

At block 315, either directly or by calling functionality executed by graphical user interface module 210, discovery assessment engine 230 may display to the operator of source computing system 110 (e.g., at client 170) an identification of the objects that include a document capable of being migrated or archived. Discovery assessment engine 230 may present the operator with options for selecting at least a subset (e.g., one or more) of the identified objects as subjects for the discovery assessment. After receiving a selection of the at least one subset of objects that include a document capable of being migrated or archived, discovery assessment engine 130 may perform a discovery assessment on each of the selected objects at block 325.

As illustrated at blocks 325 to 340, performing the discovery assessment may include a plurality of substeps. Performing the discovery assessment may, as shown at block 330, include a step of examining a property associated with each document of each selected object. Performing the discovery assessment may include determining whether the examined property qualifies as unknown or unexpected. Determining whether the examined property qualifies as unknown or unexpected may include comparing the examined property to a database of known or expected properties (e.g., database 160 of FIG. 1). In some embodiments, determining whether the examined property qualifies may include analyzing data patterns within fields and comparing known patterns to patterns detected in the documents.

As reflected by blocks 335 and 340, performing the discovery assessment may further include notifying the operator when the examination determines that the property is unknown or unexpected (e.g., when, in some embodiments, the determination indicates that the examined property does not match any known or expected property stored in the database). At block 335, notifying the operator that the discovery assessment has discovered an unknown or unexpected property in a document to be migrated or archived may include recording the unknown or unexpected property. The unknown or unexpected properties may be stored in a database. The database may be database 160 of FIG. 1, or it may be a separate and distinct database.

At block 340, the notification process may further include reporting the unknown or unexpected property to the operator. The reporting step may occur either before migration has commenced (in embodiments like that shown FIG. 3 featuring a pre-migration discovery assessment), during migration, or at a later time after all the documents that did not contain unknown or unexpected documents were successfully migrated. Recording the unknown or unexpected property detected during the discovery assessment may, in some embodiments, permit the solution to later deem the same property known or expected when encountered again in the future.

Method 300 may, as shown at blocks 345 and 350, include presenting an operator with options for mapping an unknown or unexpected property to target computing system 130 and receiving an operator-selected mapping instruction concerning how discovery assessment engine 230 should proceed. In embodiments in which the solution records unknown or unexpected properties for subsequent recognition purposes, the solution may also store the operator-selected mapping instruction associated with the unknown or unexpected property. The solution may then automatically apply the same mapping instruction (e.g., apply an operator-dictated rule) or may notify the operator of the mapping option it selected the last time discovery assessment engine 230 detected the property at issue.

The operator-selected mapping instruction may instruct the application server to treat the unknown or unexpected property as an operator-specified type of known property during the migration or archiving operation. In some cases, the operator-specified type of known property may be an available mapping option that, rather than being blindly applied by a default rule without any operator input, constitutes the closest matching mapping option in the mind of the operator. For instance, where the operator's source computing system 110 contains documents with a custom-named email property named $KeepPRIVATE$, target computing system 130 may not recognize $KeepPRIVATE$ as a known or expected property associated with documents. In such a case, when the $KeepPRIVATE$ property is detected as an unknown or unexpected property during the discovery assessment phase, discovery assessment engine 130 may display a list of mapping options from which the operator may choose. The mapping options may include a list of every possible mapping option associated with target computing system, or it may include a sublist of mapping options (e.g., only the options related to the names of document fields). Alternatively, discovery assessment engine 130 may merely identify the property and the fact that no known mapping options exist. In the latter case, the operator would have the opportunity to maintain data fidelity some other way (e.g., by preserving the data via download to a local non-transitory computer-readable storage medium).

In some cases, in comparing the unknown or unexpected property to the database of known or expected properties, discovery assessment engine 230 may look for similarities and may determine the sublist based on known properties (e.g., known mapping options to target computing system 130) that might be a closest possible match. In the case of a document property identified as $KeepPRIVATE$, discovery assessment engine 230 may recognize that, although target computing system 130 does not accept documents with a document property of $KeepPRIVATE$, target computing system 130 does accept documents with a property called PRIVATE. Accordingly, discovery assessment engine 230 may identify the known document property PRIVATE as a possible mapping option for the operator's consideration.

In another example, an operator migrating emails from a source computing system 110 to a new target computing system 130 (e.g., Notes Domino™) may have created a custom contact field with a nonstandard property name such as "WorkContact-α." Target computing system 130 may not recognize a contact field named WorkContact-α. Discovery assessment engine 230 may, in such a scenario, determine that the closest available contact field recognized by target computing system 130 would be "Work 1." Having made the foregoing determination, discovery assessment engine 230 may then identify "Work 1" as a suitable mapping option for the operator's consideration. Discovery assessment engine 230 may present the option to either use the suggested mapping option for that operation only or to apply the mapping instruction during subsequent instances in which the assessment discovers the WorkContact-α property (e.g., during all subsequent instances, during subsequent instances between the same types of computing systems, etc.).

Reporting an unknown or unexpected property detected during the discovery assessment may include displaying an identification of the unknown or unexpected property to the operator by way of a user interface (e.g., a user interface displayed at client 170 of FIG. 1). In some embodiments, the user interface may be graphical in nature, while in others it may be a non-graphical user interface. The unknown or unexpected property may, for instance, be reported to the operator through a log file, command line feedback, or a graphical user interface.

After receiving the operator-selected mapping instruction at block 350, application server 150 may execute migration module 220 at block 355 to migrate the document associated with the unknown or unexpected property (or, in some cases, the entire object to which the document belongs) based on the mapping instruction. Migrating the document based on the mapping instructions may include instructing target computing system 130 to treat the unknown or unexpected property as if it were the known property selected by the operator. In some embodiments, instructing target computing system 130 to treat the unknown or unexpected property as if it were the known property selected by the operator may include application server 150 renaming, replacing, or reconfiguring the unknown or unexpected property with the known property. Although the exemplary embodiment depicted in FIG. 3 references a discovery assessment engine in the context of a migration operation, persons of ordinary skill in the art will readily appreciate that method 300 may likewise apply to archiving operations.

FIG. 4 is a flow diagram of another exemplary computer-implemented method 400 for processing an unknown or unexpected property encountered during a migration or archiving operation. Method 400 is similar to method 300 of FIG. 3, with the exception that in method 400 the discovery assessment is illustrated as performed either during or after migration (as opposed to method 300, which illustrates the discovery assessment as a pre-migration assessment).

At block 400, upon execution, discovery assessment engine 230 may access a plurality of objects stored in memory of source computing system 110. At least a portion of the accessed objects may each include a document capable of being migrated or archived. An unknown or unexpected property may include an unknown or unexpected source object property, an unknown or unexpected data type property, unknown or unexpected metadata, or any other type of information associated with a document or object that cannot by default be mapped to a corresponding type of information recognized or accepted by target computing system 130. Persons of ordinary skill in the art should readily recognize and appreciate that the term "unknown or unexpected property" broadly refers to any type of information associated with a document or object that cannot by default be recognized or accepted by target computing system 130, whether unknown or known but simply not anticipated.

At block 410, discovery assessment engine 230 may identify the portion of objects that each include a document capable of being migrated or archived. At block 315, either directly or by calling functionality executed by graphical user interface module 210, discovery assessment engine 230 may display to the operator of source computing system 110 (e.g., at client 170) an identification of the objects that include a document capable of being migrated or archived. Discovery assessment engine 230 may present the operator with options for selecting at least a subset (e.g., one or more) of the identified objects to be migrated and ultimately subjected to the discovery assessment. At block 425, after receiving a selection of the at least one subset of objects that include a document capable of being migrated or archived, migration module 220 may migrate as many of the selected objects to target computing system 130 as target computing system 130 permits.

Either during or following migration, discovery assessment engine 230 may perform a discovery assessment on each of the selected objects as illustrated by blocks 425 to 450. As reflected by blocks 430 and 435, performing the discovery assessment may include notifying the operator when a document could not be migrated to target computing system 130 because a property associated with the document could not be recognized or accepted by target computing system 130. At block 430, notifying the operator that the discovery assessment has discovered an unknown or unexpected property in a document to be migrated or archived may include recording the unknown or unexpected property. The unknown or unexpected properties may be stored in a database. The database may be database 160 of FIG. 1, or it may be a separate and distinct database. At block 435, the notification process may further include reporting the unknown or unexpected property to the operator. Unlike in the context of FIG. 3 in which the reporting step is shown for illustrative purposes as occurring before migration has commenced, in the context of FIG. 4 the reporting step may occur either during migration or at a later time after all the documents that did not contain unknown or unexpected documents were successfully migrated. Recording the unknown or unexpected property detected during the discovery assessment may, in some embodiments, permit the solution to later deem the same property known or expected when encountered again in the future.

Method 400 may, as shown at blocks 440 and 445, include presenting an operator with options for mapping an unknown or unexpected property to target computing system 130 and receiving an operator-selected mapping instruction concerning how discovery assessment engine 230 should proceed when encountering the same property again in the future. In embodiments in which method 400 includes recording unknown or unexpected properties for subsequent recognition purposes, method 400 may also include, at block 450, storing the operator-selected mapping instruction associated with the unknown or unexpected property. The solution may then automatically apply the same mapping instruction or may notify the operator of the mapping option it selected the last time discovery assessment engine 230 detected the property at issue (e.g., the mapping instructions serves as a rule going forward). The operator-selected mapping instruction may instruct application server 150 (and ultimately target computing system 130) to treat the unknown or unexpected property as an operator-specified type of known property during a subsequent migration or archiving operation. In some embodiments, instructing application server 150 to treat the unknown or unexpected property as if it were the known property selected by the operator may include renaming, replacing, or reconfiguring the unknown or unexpected property with the known property such that the property will be accepted by target computing system 130.

Reporting an unknown or unexpected property may include displaying an identification of the unknown or unexpected property to the operator by way of a user interface (e.g., a user interface displayed at client 170 of FIG. 1). In some embodiments, the user interface may be graphical in nature, while in others it may be a non-graphical user interface. The unknown or unexpected property may, for instance, be reported to the operator through a log file, command line feedback, or a graphical user interface.

Although the exemplary embodiment depicted in FIG. 4 references a discovery assessment engine in the context of a migration operation, persons of ordinary skill in the art will readily appreciate that method 400 may likewise be drawn to archiving operations.

As is clear from the above description, a network-based solution for processing an unknown or unexpected property encountered during a migration or archiving operation has been disclosed. The foregoing methods may be performed by an executable computer program (e.g. application 200 of FIG. 2) embodied on a non-transitory computer-readable storage medium.

Figure 5:
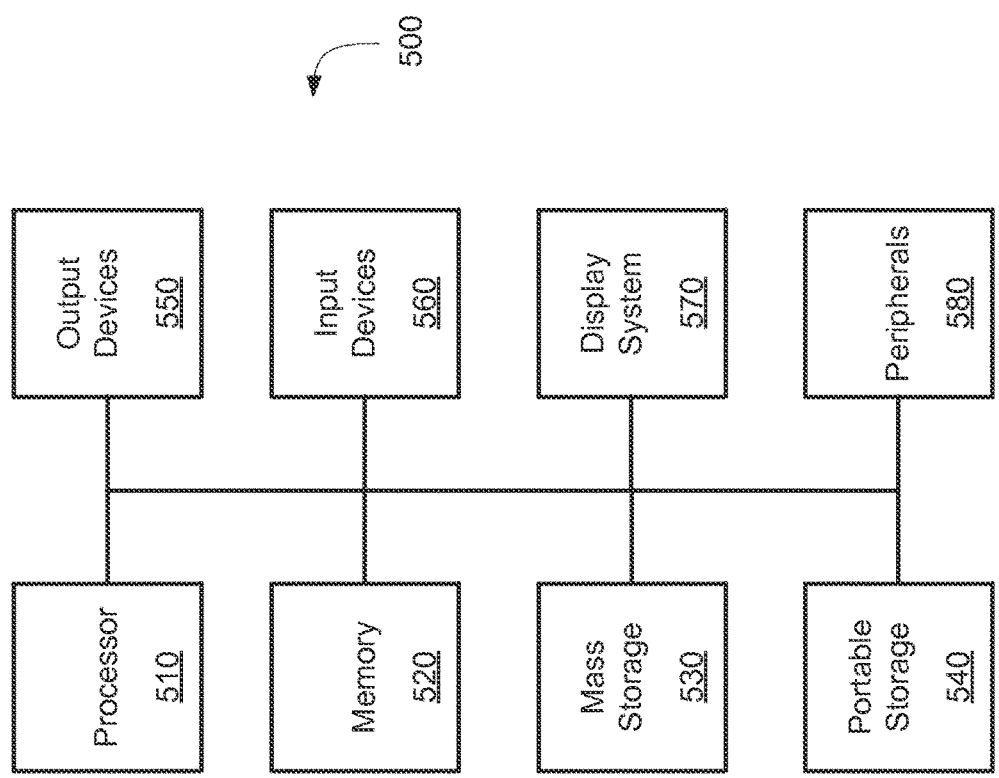
FIG. 5 is a block diagram of an exemplary system for implementing a computing device.

FIG. 5 is a block diagram of an exemplary system for implementing a computing device. The system 500 of FIG. 5 may be implemented in the context of source computing system 110, communications network 120, target computing system 130, network server 140, application server 150, and client 170 of FIG. 1. The computing system of FIG. 7 may include one or more processors 510 and memory 520. Main memory 520 may store, in part, instructions and data for execution by processor 510. Main memory 520 may store the executable code when in operation. Computing system 500 may further include a mass storage device 530, a portable storage medium drive 540, output devices 550, user input devices 560, a graphics display system 570, and peripheral devices 580.

The components shown in FIG. 5 are depicted as being connected via a single bus 590. The components may alternatively be connected through one or more data transport means. Processor 510 and main memory 520, for example, may be connected via a local microprocessor bus. Mass storage device 530, peripheral device(s) 580, portable storage device 540, and display system 570 may be connected via one or more input/output buses.

Mass storage device 530, which may be implemented with a magnetic disk drive or an optical disk drive, may be a non-volatile storage device for storing data and instructions for use by processor 510. Mass storage device 530 may store system software for implementing embodiments of the network-based solution described herein for purposes of loading the software into main memory 520.

Portable storage device 540 may operate in conjunction with a portable non-volatile storage medium, such as a compact disk or digital video disc, to input and output data and code to and from computer system 500. The system software for implementing embodiments of the present network-based solution may be stored on such a portable medium and input to computer system 500 via portable storage device 540.

Input devices 560 may provide a portion of a user interface. Input devices 560 may include an alpha-numeric keypad, such as a keyboard, touch screen, or touchpad, for inputting alpha-numeric and other information, or a pointing device, such as a mouse, a trackball, stylus, or cursor direction keys. Additionally, system 500 may include output devices 550, such as speakers, printers, network interfaces, monitors, and the like.

Display system 570 may include a liquid crystal display or other suitable display device. Display system 570 may receive textual and graphical information and may process the information for output to the display device.

Peripherals 580 may include any type of computer support device to add additional functionality to computer system 500. Peripheral device 580 could be, for example, a modem or a router.

The components illustrated in computer system 500 of FIG. 5 are those typically found in computer systems that may be suitable for use with embodiments of the present network-based solution. The depiction of such components is not intended to be exhaustive in nature, but is rather intended to represent a broad category of computer components that are well known in the art. Thus, system 500 may be a desktop computer, workstation, server, mainframe computer, laptop, tablet, smartphone or other mobile or hand-held computing device, or any other suitable computing device. Computer system 500 may also include various bus configurations, networked platforms, multi-processor platforms, etc. Various operating systems may be used, such as Unix, Linux, Windows, Macintosh OS, Palm OS, and other suitable operating systems.

The network-based solution described herein constitutes a novel, substantial, and meaningful improvement to the technical processes of migration and archiving operations. The solution provides for enhanced data fidelity during migration operations, archiving operations, and other similar transfer operations. Embodiments of the solution not only address problems during a present operation, but also allow operators to streamline future operations by establishing mapping rules.

As noted above, although the foregoing description the solution in the context of migration between two computing systems (e.g., two email platforms, two enterprise social networking platforms, or two content management platforms, and the like), the solution provides the same functionality within the context of archiving operations and other similar transfer operations. All of the benefits over the prior art provided by the solution and described above are equally applicable to such alternative embodiments. The foregoing detailed description has been presented for purposes of illustration and description. It is not intended to be exhaustive or to limit the technology to the precise form disclosed (e.g., only as applied to migrations). Many modifications and variations are possible in light of the above teaching. The described embodiments were chosen in order to best explain the principles of the technology and its practical application to enable others skilled in the art to best utilize the technology in various embodiments and with various modifications as suited to the particular use contemplated. It is intended that the scope of the technology be defined by the claims appended hereto.

What is claimed is:

1. A computer-implemented method comprising:
   in association with a data migration operation, accessing a plurality of objects stored in memory of a source computing system, at least a portion of the plurality of objects associated with a document;
   providing, in a graphical user interface, an identification of the at least portion of the objects associated with the document;
   receiving, via the graphical user interface, a selection of at least a subset of the at least portion of the objects;
   examining a property associated with the document of each selected object;
   generating an electronic notification when the examination identifies that the property is unknown or unexpected by a target computing system based on the property not currently being associated with at least one known property of the target computing system, wherein the property is unknown or unexpected when the property is determined to cause an error with the data migration operation;
   providing, via the graphical user interface, the electronic notification to indicate that the property is unknown or unexpected by the target computing system;
   providing, via the graphical user interface, an interface tool to map the property to at least one known property of the target computing system;
   receiving, via the interface tool, input to map the property to the at least one known property of the target computing system;
   responsive to receiving the input, mapping the property to the at least one known property of the target computing system;
   creating a rule for future use when encountering the property;
   electronically migrating the document from the source computing system to the target computing system based on the mapping of the property to the at least one known property, wherein migration of the document is initiated during examination of the property associated with the document;
   assigning the property as a known property of the target computing system for future mapping; and
   identifying a second document to migrate, the document including the property; and
   based on the assigning the property as a known property of the target computing system for future mapping and without receiving additional user input, mapping the property to the at least one known property of the target computing system.

2. The computer-implemented method of claim 1, wherein generating the electronic notification includes recording the unknown or unexpected property and reporting the unknown or unexpected property.

3. The computer-implemented method of claim 2, wherein the unknown or unexpected property is reported by at least one of a log file, a command line feedback, or a graphical user interface.

4. The computer-implemented method of claim 1, further comprising receiving a mapping instruction that instructs the target computing system to treat the unknown or unexpected property based on the mapping of the property to the at least one known property that comprises a specified type of known property.

5. The computer-implemented method of claim 4, further comprising transferring to the target computing system the object associated with the unknown or unexpected property based on the received mapping instruction.

6. The computer-implemented method of claim 1, further comprising receiving configuration settings that configure a network connection between an application server and the source computing system.

7. The computer-implemented method of claim 1, further comprising commencing the migrating of the document after performance of the examining.

8. The computer-implemented method of claim 1, wherein the unknown or unexpected property includes at least one of an unknown or unexpected source object property, an unknown or unexpected data type property, and unknown or unexpected metadata.

9. The computer-implemented method of claim 1, wherein at least one of the source computing system and the target computing system includes an email platform.

10. The computer-implemented method of claim 1, wherein at least one of the source computing system and the target computing system includes an enterprise social media platform.

11. The computer-implemented method of claim 1, wherein at least one of the source computing system and the target computing system includes a content management platform.

12. The computer-implemented method of claim 1, wherein the plurality of objects include at least one of a mailbox, a user, a folder, a community site, a document library, a wiki site, and a content management site.

13. The computer-implemented method of claim 1, wherein the document is at least one of an email, a contact, a calendar event, a posting, and a data file.

14. A non-transitory computer-readable storage medium having embodied thereon a computer program executable by a processor to perform a method comprising:
accessing a plurality of objects stored in memory of a source computing system, at least a portion of the plurality of objects associated with a document;
providing, in a graphical user interface, an identification of the at least portion of the objects associated with the document;
receiving, via the graphical user interface, a selection of at least a subset of the at least portion of the objects;
performing a discovery assessment on each of the selected objects, wherein the discovery assessment includes examining a property associated with the document of each selected object;
generating an electronic notification when the examination identifies that the property is unknown or unexpected by a target computing system based on the property not currently being associated with at least one known property of the target computing system, wherein the property is unknown or unexpected when the property is determined to cause an error with a data migration operation;
providing, via the graphical user interface, the electronic notification to indicate that the property is unknown or unexpected by the target computing system;
providing, via the graphical user interface, an interface tool to map the property to at least one known property of the target computing system;
receiving, via the interface tool, input to map the property to the at least one known property of the target computing system;
responsive to receiving the input, mapping the property to the at least one known property of the target computing system;
creating a rule for future use when encountering the property;
electronically moving the document from the source computing system to the target computing system based on the mapping of the property to the at least one known property, wherein migration of the document is initiated during examination of the property associated with the document;
assigning the property as a known property of the target computing system for future mapping;
identifying a second document to migrate, the document including the property; and
based on the assigning the property as a known property of the target computing system for future mapping and without receiving additional user input, mapping the property to the at least one known property of the target computing system.

15. The non-transitory computer-readable storage medium of claim 14, wherein the method further includes receiving a mapping instruction that when executed causes the target computing system to treat the unknown or unexpected property based on the mapping of the property to the at least one known property that comprises a specified type of known property.

16. The non-transitory computer-readable storage medium of claim 15, wherein the method further includes transferring to the target computing system the object associated with the unknown or unexpected property based on the received mapping instruction.

17. A system, comprising:
an application server communicatively coupled between a source computing system and a target computing system, the application server having instructions stored in memory, wherein the application server is configured to:
receive a selection of at least a portion of objects associated with a document;
examine a property associated with the document of each selected object;
generate an electronic notification when the application server identifies that the property is unknown or unexpected by the target computing system based on the property not currently being associated with at least one known property of the target computing system, wherein the property is unknown or unexpected when the property is determined to cause an error with a data migration operation;
cause a graphical user interface to provide the electronic notification to indicate that the property is unknown or unexpected by the target computing system;
cause the graphical user interface to provide an interface tool to map the property to at least one known property of the target computing system;

receive, via the interface tool, input to map the property to the at least one known property of the target computing system;

creating a rule for future use when encountering the property;

responsive to receiving the input, map the property to the at least one known property of the target computing system, wherein the document is moved from the source computing system to the target computing system based on the mapping of the property to the at least one known property, wherein migration of the document is initiated during examination of the property associated with the document;

assign the property as a known property of the target computing system for future mapping;

identifying a second document to migrate, the document including the property; and based on the assigning the property as a known property of the target computing system for future mapping and without receiving additional user input, mapping the property to the at least one known property of the target computing system.

18. The system of claim 17, wherein further execution of the instructions causes the application server to receive a mapping instruction, the mapping instruction instructs the application server to treat the unknown or unexpected property based on the mapping of the property to the at least one known property that comprises a specified type of known property.

19. The system of claim 18, wherein further execution of the instructions causes the application server to transfer to the target computing system the object associated with the unknown or unexpected property based on the received mapping instruction.

* * * * *